United States Patent [19]
Liao

[11] Patent Number: 5,165,745
[45] Date of Patent: Nov. 24, 1992

[54] VEHICLE REAR VIEW MIRROR RAIN SHIELD

[76] Inventor: Chuen R. Liao, No. 10, Alley 3, Lane 127, Lei Chung St.,, Taichung City, Taiwan

[21] Appl. No.: 747,519

[22] Filed: Aug. 20, 1991

[51] Int. Cl.⁵ ................................................ B60R 1/06
[52] U.S. Cl. ..................................... 296/1.1; 359/507
[58] Field of Search ............................ 296/1.1, 180.1; 359/507

[56] References Cited

U.S. PATENT DOCUMENTS

| | | | |
|---|---|---|---|
| 4,538,851 | 9/1985 | Taylor | 296/180.1 |
| 4,620,777 | 11/1986 | Nu | 359/507 |
| 4,668,058 | 5/1987 | Wright | 359/507 |

FOREIGN PATENT DOCUMENTS 202949  9/1986  Japan .

Primary Examiner—Robert R. Song
Attorney, Agent, or Firm—Bacon & Thomas

[57] ABSTRACT

A vehicle rear view mirror rain shield comprising of a plurality of revolving blades attached to a plurality of rotary hubs, which are sleeved on a revolving shaft and inserted with one inside another, and operated by a motor which when opened has the shape of a sector of a circle to protect a vehicle rear view mirror from rain water is disclosed. A rubber packing is attached to the first blade to seal the gap between the rain shield and the adjacent window glass.

3 Claims, 5 Drawing Sheets

VEHICLE REAR VIEW MIRROR RAIN SHIELD

BACKGROUND OF THE INVENTION

The present invention relates to rain shields and relates more particularly to a vehicle rear view mirror rain shield which is consisted of a plurality of revolving blades attached to a plurality of rotary hubs and operated by a motor which when opened has the shape of a sector of a circle to protect a vehicle rear view mirror from rain water.

A motor vehicle rear view mirror is provided for reflecting the images of objects behind a motor vehicle. However, the glass of a motor vehicle rear view mirror may be blocked when it is covered with rain drops during raining days. Therefore, rainhood or rain shield means is commonly used to protect a motor vehicle rear view mirror from the rain. U.S. Pat. No. 4,620,777 discloses an eaves-like shield to protect a motor vehicle rear view mirror from the rain. Disadvantage of this structure of shield is that the adjacent window glass is not protected from the rain and therefore, the driver's visual line to the rear view mirror may be blocked by rain water which is adhered to the adjacent window glass during raining. Japanese Patent No. 61-202949 discloses a shield for a motor vehicle rear view mirror which is consisted of a plurality of blades and which when opened has a side edge stopped against the glass of the adjacent window for protection against rain water. One disadvantage of this structure of shield is that the blades may be stuck easily during operation. Another disadvantage of this structure of shield is that the blades may be caused to produce noise when they are collapsed and not in use while the motor vehicle is running on the road.

SUMMARY OF THE INVENTION

The present invention has been accomplished to eliminate the aforesaid disadvantages. It is therefore an object of the present invention to provide a rain shield for a motor vehicle rear view mirror which can be smoothly opened when in use or smoothly closed up when not in use. It is still another object of the present invention to provide a rain shield for a motor vehicle rear view mirror which has means to protect the adjacent window glass against the rain so that the driver of the motor vehicle can clearly see therethrough the images reflected by the glass of the rear view mirror to which it is attached. It is still another object of the present invention to provide a rain shield for a motor vehicle rear view mirror which can be firmly retained in a motor vehicle rear view mirror without producing any noise.

According to one aspect of the present invention, a rain shield for a motor vehicle rear view mirror is generally comprised of a revolving shaft fastened in the casing of a motor vehicle rear view mirror, a plurality of rotary hubs sleeved on said revolving shaft and inserted with one inside another, and a plurality of blades secured to said rotary hubs at one end, wherein said rotary hubs each has a groove through the outer wall thereof in different length into which a driving rod from said revolving shaft is inserted to carry said blades to open into the shape of a sector of a circle for protection against the rain or to close up together when not in use.

According to another aspect of the present invention, the rain shield has a packing rubber attached to the peripheral edge of the first blade thereof which is squeezed to seal off the gap between the adjacent window glass and the blades thereof so that the adjacent window glass is simultaneously protected against the rain.

According to still another aspect of the present invention, the casing of the motor vehicle rear view mirror has two guide channels to guide the blades of the rain shield inside the casing of the motor vehicle rear view mirror when the blades are drawn up together, so that the blades can be firmly retained in position when the rain shield is not in use.

DETAILED DESCRIPTION OF THE PREFERRED EMBODIMENT

Figure 1:
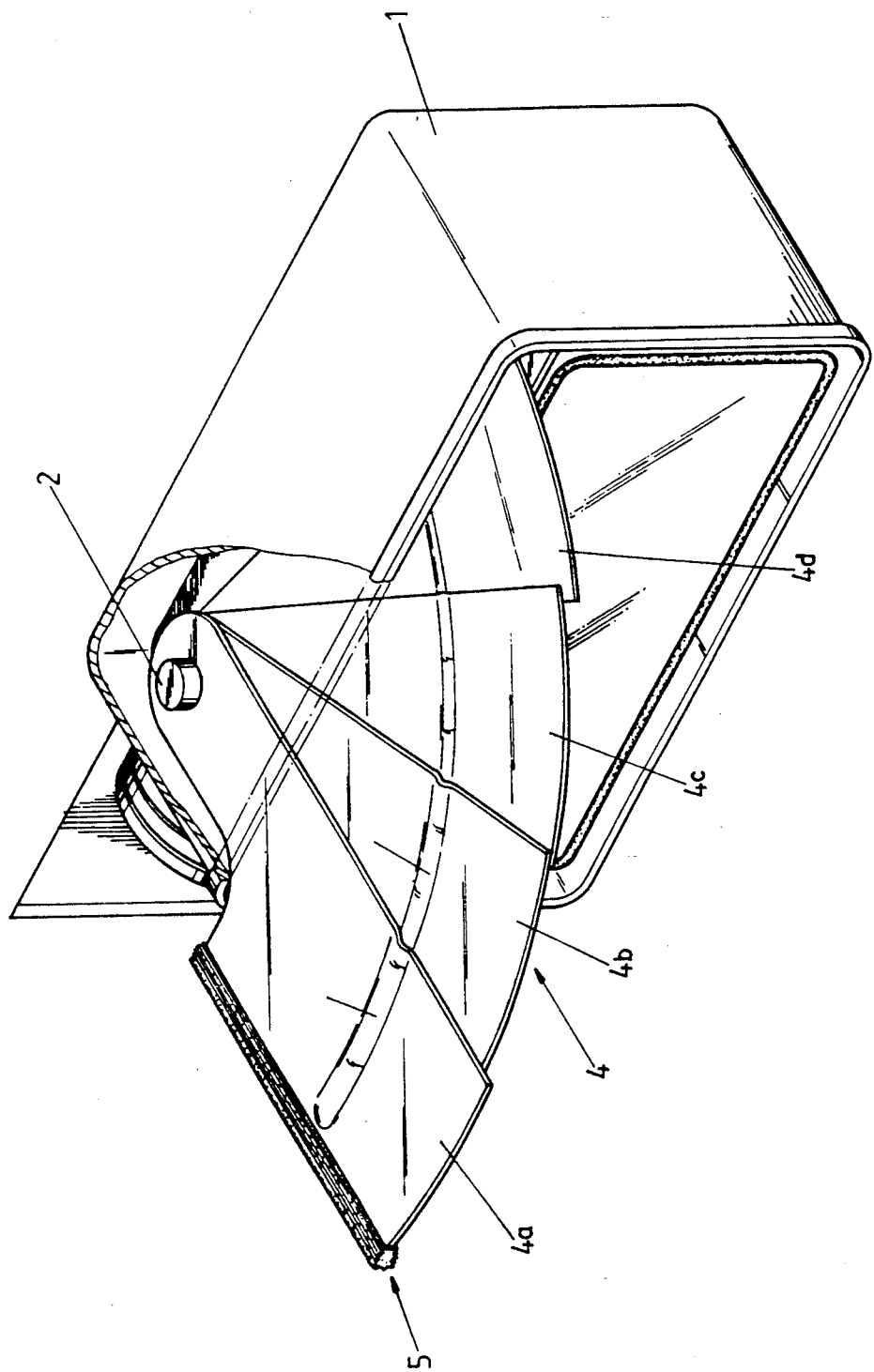
FIG. 1 is a perspective view of a vehicle rear view mirror constructed according to the present invention in which the rain shield is opened to protect against the rain.
Figure 2:
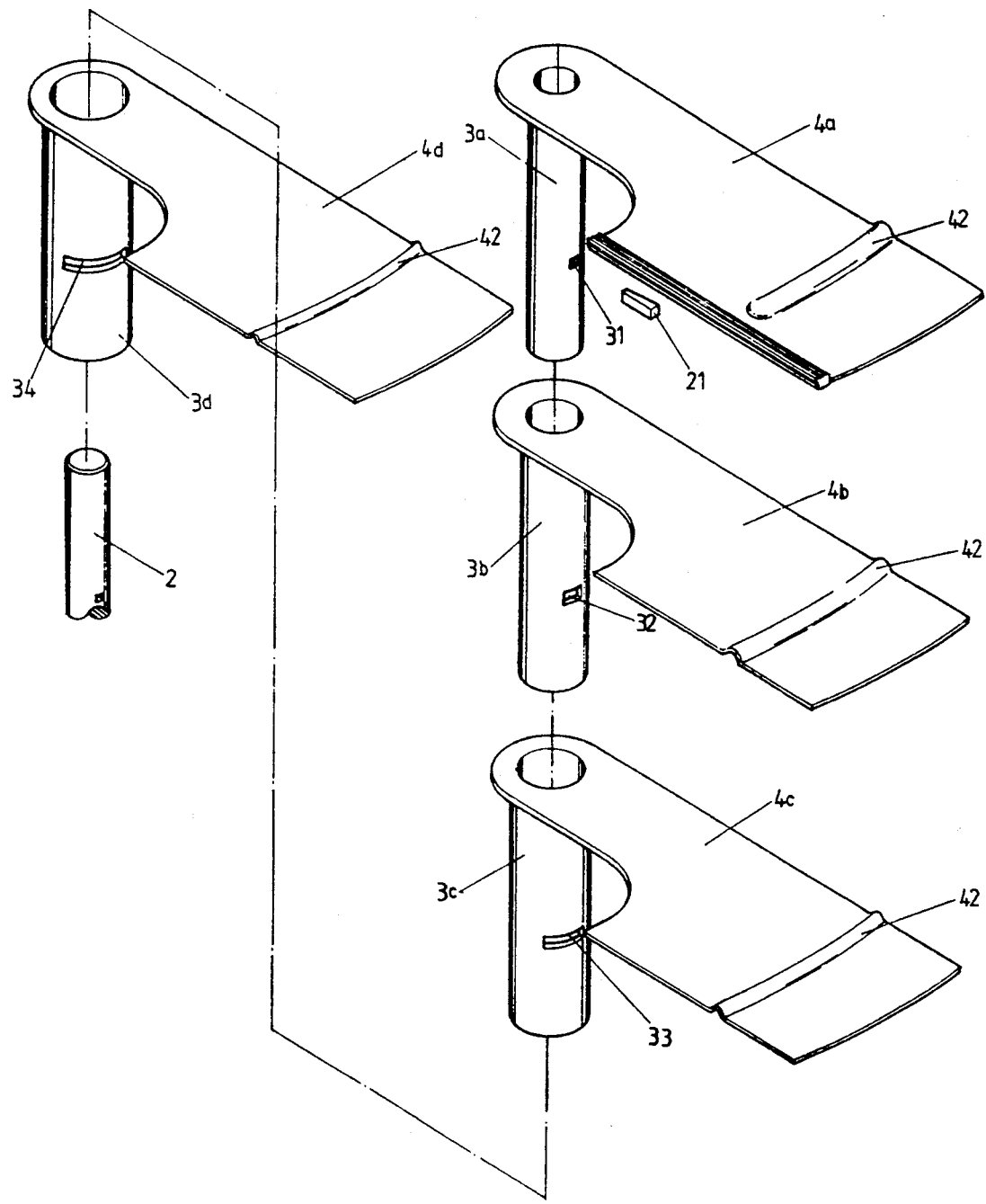
FIG. 2 is an exploded perspective view of the preferred embodiment of the rain shield of the present invention.
Figure 4:
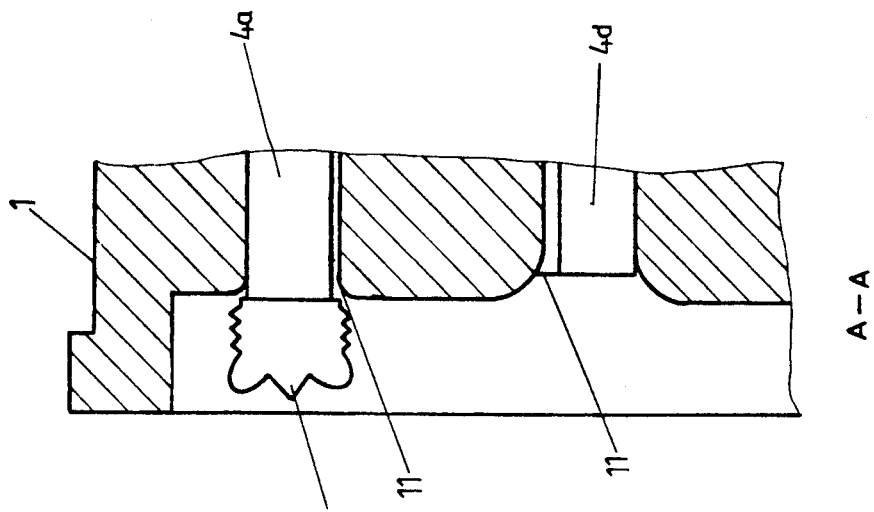
FIG. 4 is a cross section taken on line A—A of FIG. 3.
Figure 3:
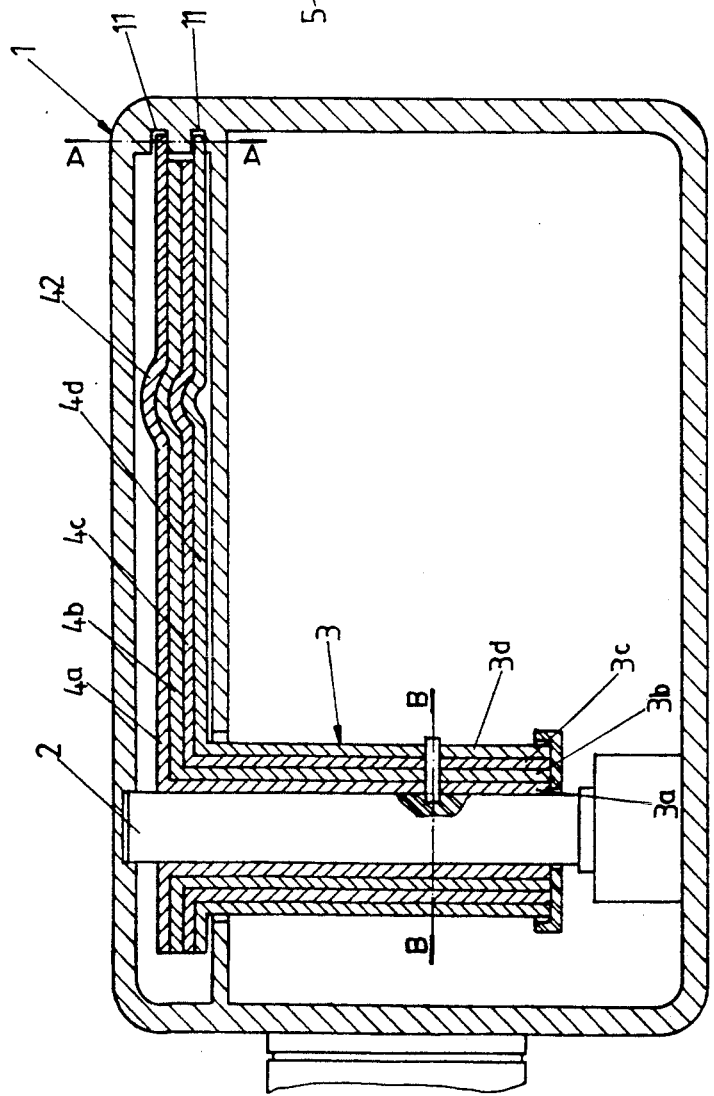
FIG. 3 is a front sectional view of the vehicle rear view mirror of FIG. 1.

Referring to FIGS. 1, 2 and 3, a revolving shaft 2 is vertically fastened inside the casing 1 of a motor vehicle rear view mirror to carry a plurality of blades 4 to open into the shape of a sector of a circle or gather together through a plurality of rotary hubs 3, wherein the revolving shaft 2 may be driven to rotate through manual operation or by a motor.

Figure 5:
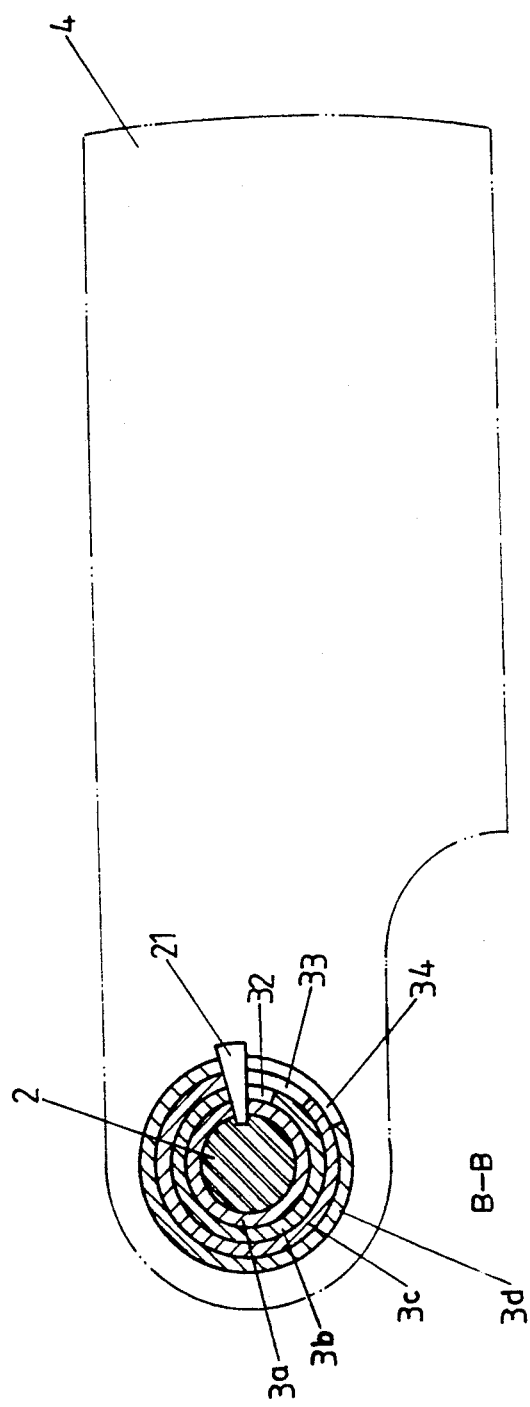
FIG. 5 is a cross section taken on line B—B of FIG. 4.

Referring to FIG. 2 again, there are four blades 4a, 4b, 4c, 4d respectively attached to four rotary hubs 3a, 3b, 3c, 3d at right angles, wherein said rotary hubs are made in such sizes that one can be inserted in another and, the smallest one, namely, the first rotary hub 3a has an inner diameter suitable for the insertion therein of the revolving shaft 2. The revolving shaft has a driving rod 21 extending from the outer wall surface thereof at right angle. Corresponding to the driving rod 21, the rotary hubs 3a, 3b, 3c, 3d each has a groove 31, 32, 33 or 34 through the side wall thereof at different length (see FIG. 5). By inserting the driving rod 21 in the grooves 31, 32, 33, 34, the rotary hubs 3a, 3b, 3c, 3d can be carried to rotate when the revolving shaft 2 is rotated. The length of the groove 31, 32, 33 or 34 on each rotary hub 3a, 3b, 3c or 3d is made in right proportion to the inner diameter thereof, i.e., the smallest rotary hub 3a has a shortest groove 31 and the largest rotary hub 3d has a longest groove 34. Therefore, when the revolving shaft 2 is rotated, the rotary hubs 3a, 3b, 3c, 3d will be carried to rotate by the driving rod 21 one after another. Because the grooves 31, 32, 33, 34 are different in length, the blades 4a, 4b, 4c, 4d can be rotated through different angles respectively so as to open into the shape of a sector of a circle. When the revolving shaft 2 is rotated in an reverse direction, the opened blades 4a, 4b, 4c, 4d are drawn up together inside the casing 1 of the rear view mirror.

Referring to FIG. 3 again, the first blade 4a of the fist rotary hub 3a and the last blade 4d of the last rotary hub 3d are longer in size relative to the two intermediate blades 4b, 4c of the intermediate rotary hubs 3b, 3c. The casing 1 of the rear view mirror has two guide channels 11 on the vertical inner wall thereof at one side opposite to the revolving shaft 2 for guiding the first and last blades 4a, 4d into the casing 1 of the rear view mirror when the blades 4a, 4b, 4c, 4d are drawn up together, which guide channels 11 each has a chamfered edge (not shown) for guiding the blade 4a or 4d into position. By means of the arrangement of the guide channels 11, the blades when drawn together inside the casing 1 of the rear view mirror are firmly retained in place against shake waves. Further, each blade 4a, 4b, 4c, 4d has a reinforcing rib 42 formed through the process of punching in suitable size so that the reinforcing rib of one blade can be engaged in the reinforcing rib of another when the blades are drawn up together.

Figure 6:
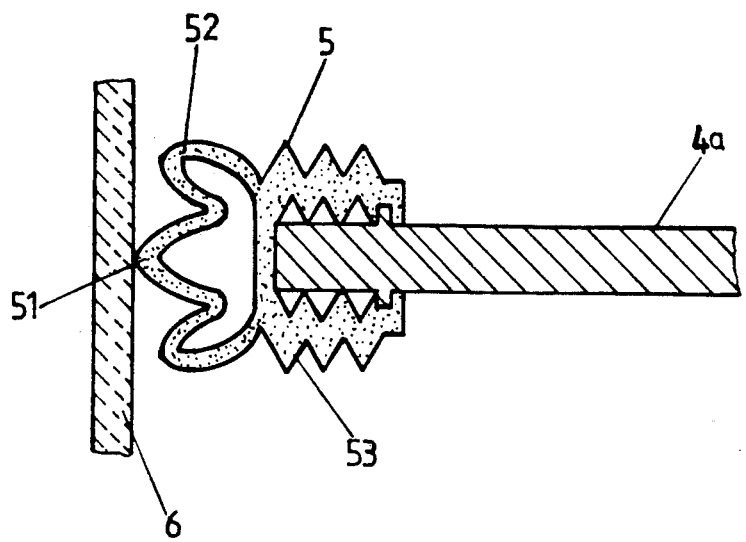
FIG. 6 is a schematic sectional view showing that the packing rubber is disposed in contact with the window glass.
Figure 7:
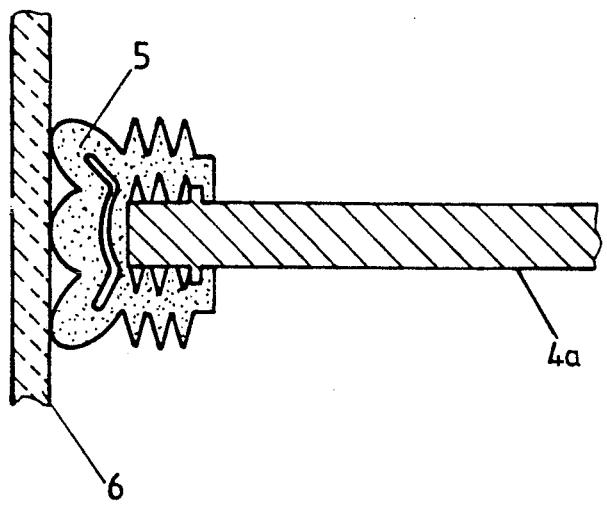
FIG. 7 is a schematic sectional view showing that the packing rubber is squeezed to tightly stop against the window glass so as to seal the gap between the upper blade and the window glass.

Referring to FIGS. 6 and 7, the first blade 4a of the first rotary hub 3a has a packing rubber 5 attached to the peripheral edge thereof at one side, which packing rubber 5 is made in a hollow structure having a curved peripheral edge forming into three projecting ends with one 51 at the middle protruding over the other two projecting ends 52 (see FIG. 6). When the blades 4a, 4b, 4c, 4d are opened, the packing rubber 5 of the first blade 4a is squeezed to deform with the three projecting ends 51, 52 thereof tightly stopped against the adjacent window glass 6 to seal off the gap, and therefore, the window glass 6 as well as the rear view mirror are protected against the rain.

I claim:

1. A vehicle rear view mirror rain shield comprising:

a plurality of blades adapted to open into the shape of a sector of a circle;

a plurality of concentrically mounted hubs each of which carries a respective one of said plurality of blades, each of said hubs further including a groove formed therein, said grooves varying in length among said hubs;

a shaft adapted to be rotatably mounted within a casing of a motor vehicle rear view mirror, said shaft extending through said plurality of hubs;

a driving rod secured to said shaft and extending through said grooves; and means for rotating said shaft to cause said hubs to rotate one after another through different angles relative to each other by means of said driving rod and groove lengths so that said blades sequentially open into the sector shape in order to protect the motor vehicle rear view mirror.

2. The rain shield of claim 1, wherein said blades include a first blade at the top, said first blade having a packing rubber attached thereto at one side and moved to stop against a motor vehicle's window glass to seal the gap therebetween, said packing rubber being formed of a hollow structure having a curved peripheral edge at one side and squeezed to tightly stop against said window glass when said blades are opened, said curved peripheral edge comprising a middle projecting ends at the middle and two side projecting end at two opposite sides, said middle projecting end being adapted to protrude over said two side projecting ends.

3. The rain shield of claim 1, wherein said blades include a first blade at the top, a second blade at the bottom and a plurality of intermediate blades retained therebetween, said first and last blades being relatively longer than said intermediate blades and driven to insert through two guide channels on the inner wall surface of the casing of said motor vehicle rear view mirror when said blades are drawn up together.

* * * * *